(No Model.)
M. SCOUGALE.
CORD FASTENER FOR ENVELOPES.
No. 541,692. Patented June 25, 1895.
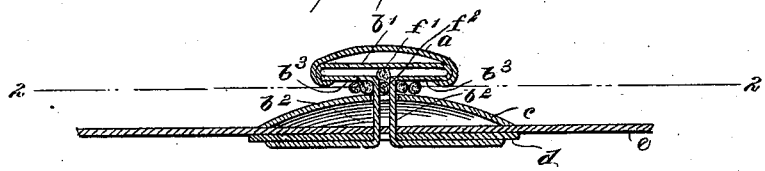
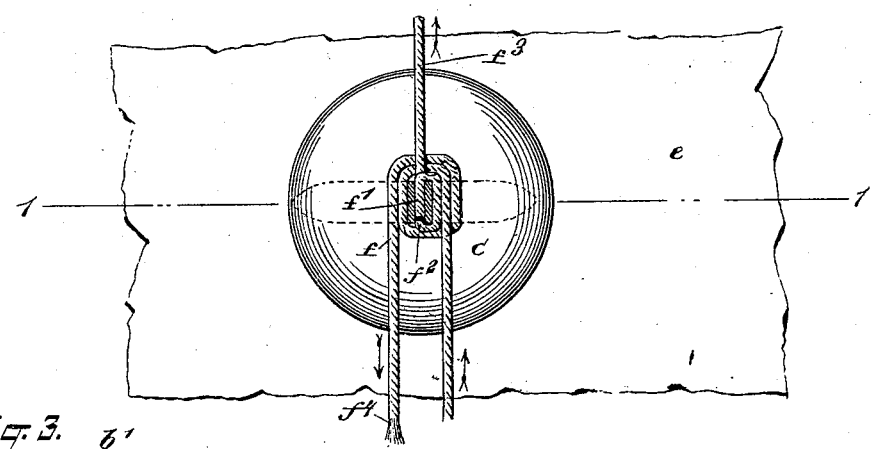
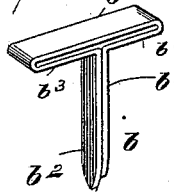
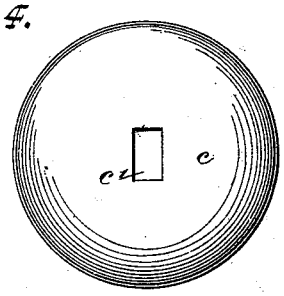
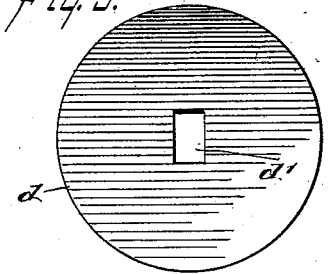
WITNESSES:
William Goebel
J. L. McAuliffe
INVENTOR
M. Scougale
BY
Munn & Co.
ATTORNEYS.

UNITED STATES PATENT OFFICE.

MALCOLM SCOUGALE, OF FORT WORTH, TEXAS.

CORD-FASTENER FOR ENVELOPES.

SPECIFICATION forming part of Letters Patent No. 541,692, dated June 25, 1895.

Application filed December 1, 1894. Serial No. 530,571. (No model.)

*To all whom it may concern:*

Be it known that I, MALCOLM SCOUGALE, of Fort Worth, in the county of Tarrant and State of Texas, have invented a new and Improved Cord-Fastener for Envelopes and other Packages, of which the following is a full, clear, and exact description.

The invention relates particularly to means for securing a cord on a merchandise envelope or like package, and has for its object to provide a means for permanently holding one end of the cord in an improved and secure manner, and adapted for temporarily securing the free end when desired.

Reference is to be had to the accompanying drawings forming a part of this specification, in which similar letters of reference indicate corresponding parts in all the figures.

Figure 1 is a vertical sectional view of a fastener formed in accordance with my invention, showing the same applied, the section being taken on line 1—1, Fig. 2. Fig. 2 is a sectional plan view, the section being taken on line 2—2, Fig. 1. Fig. 3 is a detail perspective view of the shank of the fastener. Fig. 4 is a plan view of the outer disk employed in connection with the head of the fastener; and Fig. 5 is a plan view of the inner disk.

In forming a fastener in accordance with my invention, a cap $a$ is provided, its edge being inturned, and such edge serves to hold the upper end or head $b'$ of a shank $b$, such head $b'$ projecting at both sides of the shank. The shank and its head are formed of flat flexible metal bent into the proper shape, the shank proper $b$, as well as the head, being of two thicknesses. The fastener is completed by an outer disk $c$ and an inner disk $d$, between which the paper $e$ of the envelope or other package is received and clamped, and these disks are each formed with an oblong central orifice $c'$, $d'$, through which the two flat arms $b^2$ of the shank are passed, the ends of such arms being bent down against the inner side of the inner disk $d$, as appears clearly in Fig. 1.

The outer disk $c$ is convexed, and at its center, adjacent to the shank $b$, the disk is sufficiently close to the head $b'$ to permit the cord $f$ to be forced between such head and disk. The cord is secured to the fastener by forcing it between the arms of the shank, as at $f'$, Figs. 1 and 2, then giving it a turn around one arm of the shank and passing it again between the arms as at $f^2$, from which it departs as at $f^3$, to provide a proper length to be passed around the envelope or other package and permit its free end to be given one or two turns around the shank, as indicated in Figs. 1 and 2, the extreme end $f^4$ serving for taking hold in unfastening such free end.

It will be seen that the divided shank enables the cord to be thus securely held by forcing the cord between the members of the shank, and the cross pieces $b^3$, $b^3$ of the head of the shank form an improved clamp in connection with the convex disk $c$, since such cross pieces will readily yield to the entrance of the cord between such cross pieces and the disk, but will react to positively clamp the cord in position.

While the above described method is considered preferable, yet the normally engaged end of the cord may be secured to said fastener in any practicable manner, the gist of this invention being the novel combination of the cap $a$, shank $b$ and its head $b'$ with the outer disk $c$ and inner disk $d$, substantially in the manner and for the purposes herein set forth.

Having thus described my invention, I claim as new and desire to secure by Letters Patent—

1. A fastener for the cords of envelopes or other packages, comprising the cap $a$, the shank $b$ held to said cap by engagement of its head $b'$, the outer disk $c$ and inner disk $d$, said disks being adapted to receive and clamp the material of the envelope or other package, the said shank having two members that pass through the disks and are adapted to be bent at their ends, substantially as described.

2. As a new article of manufacture, an envelope sheet or package having a securing device comprising a string and a fastener, the latter consisting of a pair of opposed apertured disks, the outer one of which is convex on its outer surface, a head above or outside of such convex disk, and a shank composed of two members held to the head, extending thence through the disks, thereby holding the fastener to the envelope or the like, the cord having one end held to the shank between the members thereof, the opposite end of the cord being free, substantially as described.

3. The herein described fastener for envelopes and other packages, consisting of a head or cap, a shank formed of flat metal and provided with a head held to the cap, providing yielding cross pieces at two sides of the shank, said shank further being in two thicknesses, an outer convex disk and an inner disk, between which the envelope or the like is clasped, the arms or members of the shank being bent down on the inner side of the inner disk, and a cord held at one end to such fastener, substantially as described.

MALCOLM SCOUGALE.

Witnesses:
ERNEST R. SCOUGALE,
WILLIAM D. WILLIAMS.